US009846735B2

(12) United States Patent
Kosuru et al.

(10) Patent No.: US 9,846,735 B2
(45) Date of Patent: Dec. 19, 2017

(54) METHOD AND APPARATUS FOR PROCESSING PROBE DATA

(75) Inventors: Yekesa Kosuru, Westford, MA (US); Alexey Yakubovich, Buffalo Grove, IL (US); Senthil Natesan, Bartlett, IL (US); Rajiv Synghal, Concord, CA (US); Boris Lublinsky, Naperville, IL (US)

(73) Assignee: HERE Global B.V., Veldhoven (NL)

( * ) Notice: Subject to any disclaimer, the term of this patent is extended or adjusted under 35 U.S.C. 154(b) by 842 days.

(21) Appl. No.: 14/113,179

(22) PCT Filed: Apr. 19, 2012
(Under 37 CFR 1.47)

(86) PCT No.: PCT/IB2012/051986
§ 371 (c)(1),
(2), (4) Date: Jun. 6, 2014

(87) PCT Pub. No.: WO2012/143896
PCT Pub. Date: Oct. 26, 2012

(65) Prior Publication Data
US 2014/0317124 A1    Oct. 23, 2014

Related U.S. Application Data

(60) Provisional application No. 61/477,456, filed on Apr. 20, 2011.

(51) Int. Cl.
*G06F 17/30*    (2006.01)
*G01C 21/20*    (2006.01)
(Continued)

(52) U.S. Cl.
CPC ....... *G06F 17/30595* (2013.01); *G01C 21/32* (2013.01)

(58) Field of Classification Search
CPC ........ G06F 17/30864; G06F 17/30867; G06Q 30/02
(Continued)

(56) References Cited

U.S. PATENT DOCUMENTS 6,415,227 B1 * 7/2002 Lin ........................ G01C 21/20
340/988
7,634,465 B2 * 12/2009 Sareen .................. G06T 3/4038
(Continued)

OTHER PUBLICATIONS

International Search Report for corresponding International Application No. PCT/IB2012/051986 dated Oct. 16, 2012, 3 pages.

*Primary Examiner* — Mohammad S Rostami
*Assistant Examiner* — Robert F May
(74) *Attorney, Agent, or Firm* — Ditthavong & Steiner, P.C.

(57) ABSTRACT

An approach is provided for providing a unified extensible platform for overall probe data and storage. The approach comprises causing, at least in part, a storage of probe data in one or more information spaces, one or more namespaces of the one or more information spaces, or a combination thereof. The approach further comprises determining one or more nodes for processing the probe data based, at least in part, on one or more context criteria, the one or more nodes associated with the one or more information spaces. The approach also comprises determining to provide access to the processed probe data via the one or more information spaces, the one or more namespaces, or a combination thereof.

19 Claims, 13 Drawing Sheets

(51) Int. Cl.
  *G06Q 30/02* (2012.01)
  *G06F 3/01* (2006.01)
  *G01C 21/32* (2006.01)

(58) Field of Classification Search
  USPC .......................................................... 707/748
  See application file for complete search history.

(56) References Cited

U.S. PATENT DOCUMENTS

| | | | |
|---|---|---|---|
| 2009/0115779 A1* | 5/2009 | Shulman | G01B 11/2513 345/419 |
| 2009/0138497 A1* | 5/2009 | Zavoli | G01C 21/32 |
| 2010/0179855 A1 | 7/2010 | Chen et al. | |
| 2010/0286899 A1* | 11/2010 | Jain | G08G 1/127 701/119 |
| 2010/0306286 A1 | 12/2010 | Chiu et al. | |
| 2011/0153186 A1* | 6/2011 | Jakobson | G01C 21/20 701/532 |
| 2011/0202271 A1* | 8/2011 | Kruithof | G01C 21/32 701/533 |
| 2012/0166416 A1* | 6/2012 | Murdock | G06F 17/3087 707/711 |
| 2012/0173606 A1* | 7/2012 | Becker | G01C 21/32 709/203 |
| 2013/0030690 A1* | 1/2013 | Witmer | G01C 21/32 701/409 |
| 2013/0322702 A1* | 12/2013 | Piemonte | G06T 15/005 382/113 |
| 2014/0344296 A1* | 11/2014 | Chawathe | G06F 17/30241 707/755 |

* cited by examiner

METHOD AND APPARATUS FOR PROCESSING PROBE DATA

RELATED APPLICATIONS

This application claims the benefit of the earlier filing date of U.S. Provisional Application Ser. No. 61/477,456 filed Apr. 20, 2011, entitled "Method and Apparatus for Processing Probe Data," the entirety of which is incorporated herein by reference.

BACKGROUND

Service providers and device manufacturers (e.g., wireless, cellular, etc.) are continually challenged to deliver value and convenience to consumers by, for example, providing compelling network services. One area of need has been in the realm of navigation services. Navigation services rely on a plethora of probe data to keep the services provided up to date. Some services handle so much probe data that a need for providing a unified extensible platform for overall probe data and storage exists.

SOME EXAMPLE EMBODIMENTS

Therefore, there is a need for an approach for providing a unified extensible platform for overall probe data and storage.

According to one embodiment, a method comprises causing, at least in part, a storage of probe data in one or more information spaces, one or more namespaces of the one or more information spaces, or a combination thereof. The method also comprises determining one or more nodes for processing the probe data based, at least in part, on one or more context criteria, the one or more nodes associated with the one or more information spaces. The method further comprises determining to provide access to the processed probe data via the one or more information spaces, the one or more namespaces, or a combination thereof.

According to another embodiment, an apparatus comprises at least one processor, and at least one memory including computer program code, the at least one memory and the computer program code configured to, with the at least one processor, cause, at least in part, the apparatus to cause, at least in part, a storage of probe data in one or more information spaces, one or more namespaces of the one or more information spaces, or a combination thereof. The apparatus is also caused to determine one or more nodes for processing the probe data based, at least in part, on one or more context criteria, the one or more nodes associated with the one or more information spaces. The apparatus is further caused to determine to provide access to the processed probe data via the one or more information spaces, the one or more namespaces, or a combination thereof.

According to another embodiment, a computer-readable storage medium carries one or more sequences of one or more instructions which, when executed by one or more processors, cause, at least in part, an apparatus to cause, at least in part, a storage of probe data in one or more information spaces, one or more namespaces of the one or more information spaces, or a combination thereof. The apparatus is also caused to determine one or more nodes for processing the probe data based, at least in part, on one or more context criteria, the one or more nodes associated with the one or more information spaces. The apparatus is further caused to determine to provide access to the processed probe data via the one or more information spaces, the one or more namespaces, or a combination thereof.

According to another embodiment, an apparatus comprises means for causing, at least in part, a storage of probe data in one or more information spaces, one or more namespaces of the one or more information spaces, or a combination thereof. The apparatus also comprises means for determining one or more nodes for processing the probe data based, at least in part, on one or more context criteria, the one or more nodes associated with the one or more information spaces. The apparatus further comprises means for determining to provide access to the processed probe data via the one or more information spaces, the one or more namespaces, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-20, and 36-38.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a unified extensible platform for overall probe data and storage are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term probe data refers to any information or data that may be processed relating to information about a geographic location and any occurrences that may be happening at or near that geographic location. The probe data may be used for updating relevant navigation information that is supplied by a navigation service provider to its subscribers, for example.

Figure 1:
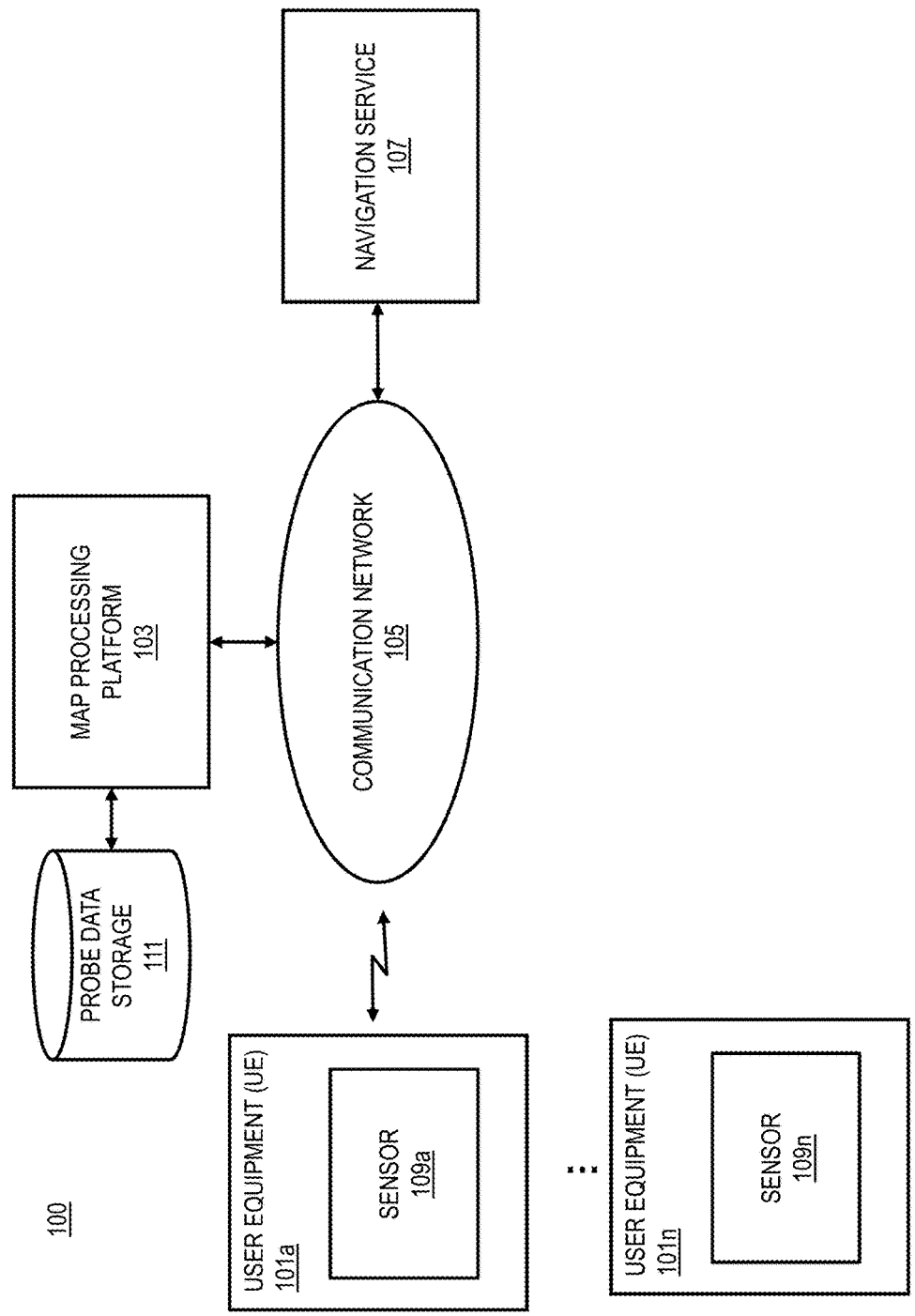
FIG. 1 is a diagram of a system capable of providing a unified extensible platform for overall probe data and storage, according to one embodiment.

FIG. 1 is a diagram of a system capable of providing a unified extensible platform for overall probe data and storage, according to one embodiment. Navigation information service providers are processing ever increasing amount of probe data received from various sources of probe data. For example, some providers may process probe data on the order of 100 GB of probe data per week. Such service providers use multiple probe processing applications for separately handling the massive amounts of probe data that must be processes to have up to date navigation information. The multiple probe processing applications may be, for example, for traffic, maps enhancement, pedestrian mapping and map communities. Conventional probe processing applications use their own database and proprietary tools for its populating and maintenance routines. This leads to very expensive solutions (e.g., multiplicity of database containing the same data) and potential inconsistency of data used by different applications. Moreover, introducing a new probe processing application would be very expensive because it would require introducing new hardware and software.

To address this problem, a system 100 of FIG. 1 introduces the capability to provide a unified extensible platform for overall probes data storage and processing. Creation of a unified platform that contains all the probe data available and provides a unified framework for probe data accessing and processing allows for easily creating new solutions, which can leverage existing solutions and their intermediate results.

Single probe data contains at least three types of properties: required properties (such as latitude, longitude, time, vendor, speed and some others), optional properties (such as number of satellites, accuracy and some others), and secondary (calculated) properties (such as road segment, probe position on a road segment, type of road and some others), for example. Probe data properties are not necessarily fixed, however, and may vary depending on the source of the probe data.

Prevalent sets of operations on probes are geospatial and temporal. Accordingly, probe data inside a platform is organized by tiles/dates. A tile represents a geospatial extent (bounding box) and is manifested in a system as a directory. The directory contains files representing probe data for this tile for a given time interval. Such organization allows for a very quick searches of available probe data for a given time interval for a given geographic area. An area is mapped to the tiling system, which in turn, limits a search to a set of directories. Temporal data, accordingly, specifies tiles in those directories. This approach allows for maintaining huge (and increasing) amounts of probe data while enabling predictable access times. Alternatively, or in additional to the geospatial temporal data, any other context information that may be relevant, such as weather for example, may be used in specifying directories or for comparing probe data for storage.

In one embodiment, an implementation of the above-discussed approach has two primary steps (1) bringing probe data from different providers into a consistent internal representation (i.e. ingestion) and (2) processing probe data based on the internal probe data representation. An overall scheme for probe data ingestion may be, for example, probe data coming into system in a form of files (e.g. .csv, but other data formats are anticipated) that are used as an input to a Map/Reduce job, which parallelizes ingestion of large amounts of input data. A mapper may then process every ingested probe point (hundreds or even thousands of mappers can run in parallel) individually. For every probe point the mapper calculates the tile that it belongs and its timestamp. The tile designation and timestamp may be used as a compound key for a reducer. Once the mappers are finished, a processing module like "Hadoop" shuffles and sorts the results of all the maps to reducers. This guarantees that all the probe points with a given key are directed to the same reducer. The amount of reducers is scalable and can be configured based on the amount of the input data. The reducer then writes the newly ingested data into an internal system for representation. Additionally during the probe ingestion, filtering (based on verification of required fields) and calculation of secondary properties can also be provided.

In one embodiment, a sample processing application may be provided in which query probes are supplied for an administrative area. In this embodiment, in addition to the analytics platform, a structured data platform may be leveraged as well. A structured data platform is used as a lookup table which allows for retrieval of the administrative area's polygon (i.e. reference data). The implementation of this application is another map/reduce job. This job's driver retrieves an administrative area polygon and calculates a set of tiles enclosing the polygon. Once these calculations are complete, a driver splits the probe data extraction between multiple map jobs. The content of the extracted files is processed and a required time interval for representing a set of tiles in parallel is calculated. Each map job implements a secondary filtering, i.e., selecting only probe data for a given administrative area polygon and writes the probe data into the map's output. The map/reduce job in this embodiment has a single reducer. Because this job has a single reducer, all results of all map's jobs are passed to the single reducer, and the reducer writes out all the results of the query.

Optionally, in certain embodiments, primary probe selection can be combined with a re-calculation of secondary probe properties. This additional step can be desirable because there is more than one way to associate probes with different maps. Further processing can also be built on top of query results following the same design approach. Typically, such further processing is based on applying machine learning, clustering, pattern recognition and other algorithms to the selected set of probes.

As shown in FIG. 1, the system 100 comprises user equipment (UEs) 101*a*-101*n* having connectivity to a map processing platform 103 via a communication network 105. In this description, the UEs 101*a*-101*n* may be collective referred as the UE 101. The UE 101 also has connectivity to a navigation service 107 via the communication network 105. The UE 101 may include sensors 109*a*-109*n* for generating probe data. The map processing platform 103 may receive probe data from the UE 101 that may be considered for a map/reduce job. The map processing platform 103 may exist within the UE 101, or within the navigation service 107, or independently. The probe data provided to the map processing platform 103 may include data from the sensor 109 connected to the UE 101. The sensor 109 may include a location sensor, a speed sensor, an audio sensor, brightness sensor, etc. The probe data provided to the map processing platform 103 may also be manually input at the UE 101, or it may also be received from the navigation service 107. The probe data storage 111 may be connected to the map processing platform 103 to store the probe data in one or more information spaces, one or more namespaces of the one or more information spaces, or a combination thereof.

In one embodiment, the system 100 causes a storage of probe data in one or more information spaces, one or more namespaces of the one or more information spaces, or a combination thereof. The system 100 also determines one or more nodes for processing the probe data based, at least in part, on one or more context criteria, the one or more nodes associated with the one or more information spaces. Such nodes may be based on availability for sending the information for relay or for actually processing the probe data. The system 100 may also determine to provide access to the processed probe data via the one or more information spaces and/or the one or more namespaces. Access may be limited for security or privacy purposes, for example. The probe data may be received by the system 100 continuously, periodically, according to a schedule, on demand, or a combination thereof from one or more vendors, one or more devices, or a combination thereof. This enables the system 100 and its mappings to be up to date with regard to navigation data, traffic information, pedestrian information, map community information, etc.

Specifically, the navigation data may be, for example, missing road information, incorrect road information, direction of traffic information, turn restriction information, traffic sign information, stop sign information, parking lot information, or any combination thereof. The traffic information may be traffic pattern history information, traffic speed information, traffic speed restriction information, road construction information, or any combination thereof, for example. The pedestrian information may be, for example, incorrect walkway or crosswalk information, access information, density information, or any combination thereof. And, the map community information may be, for example, map reporting information, road obstruction information, personal map layer information, places of interest information, or any combination thereof.

In one embodiment, the system 100 causes an initiation of the processing of the probe data based, at least in part, on the receiving of the probe data. In other words, the map processing platform 103, for example, will automatically update the mappings because receiving the probe data triggers such a process. The system 100 also normalizes the probe data based, at least in part, on one or more schemas associated with the one or more information spaces, the one or more namespaces, or a combination thereof. This enables the probe data to be weighted and properly compared to other probe data that is available for the system 100 to process. For example, probe data that is collected may be skewed one way or another which may affect the outcome of any query for map or navigation data associated with an area. Such skewing may be time or weather dependent, for example. The system 100 takes all of this information into account when normalizing the probe data so that appropriate probe data may be mapped to a correct reducer and the mappings may be updated accordingly.

The system 100 may further process the of source information associated with the probe data to determine one or more weighting values for at least a portion of the probe data, and base the processing of the probe data on the weighting value. For instance, it may be important to consider the source of probe data, such as whether the source has a history of being reliable, or if the equipment for retrieving probe data is properly calibrated, etc.

In one embodiment, the probe data may relate, to one or more mapping services. In such a case, the probe data may be partitioned by the map processing platform 103 into one or more tiles based on the one or more context criteria. In this embodiment, the one or more tiles represent at least in part a geospatial extent, as discussed above. The map processing platform 103 may then base the storage of the probe data on the one or more tiles. If there is more than one reducer in the map/reduce job run by the system 100, the tile and a timestamp of the probe data may serve as a key to ensure that probe data having a same key are sent to the same reducer.

In one embodiment, the system 100 may process the probe data to determine one or more anomalies in mapping data associated with the one or more mapping services, and initiate one or more actions to verify, to flag, to correct, or a combination thereof the one or more anomalies. For example, if a UE 101 provides probe data that may seem so absurd that it is unlikely that the probe data is accurate. For instance, at a particular time of day when a traffic pattern is normally absolute gridlock in the middle of New York City, and the probe data indicates that there isn't any traffic, and is in fact traveling at 130 mph, this may raise a flag. Of course flags may not be raised based on such absurdities, but also may be based on anything that is out of the ordinary or may be based on the particular source of the probe data, for example. In this embodiment, the system 100 may update the mapping data based on the one or more anomalies and/or the one or more actions, if verified (or the system may just update the mapping data without verifying the anomaly). For example, the mapping data may be updated, using the example discussed above, so that a navigation service 107 may provide that there isn't any traffic at a time when there normally is. Further, the system 100 may generate a report and/or and alert of the one or more anomalies. The report may be used to flag a particular source of the probe data or to alert users of the system 100 or subscribers of the navigation service 107 that something is out of the ordinary, be it good or bad (e.g. lots of traffic or no traffic).

By way of example, the UE 101, (UEs) the map processing platform 103, and the navigation service 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

Figure 2:
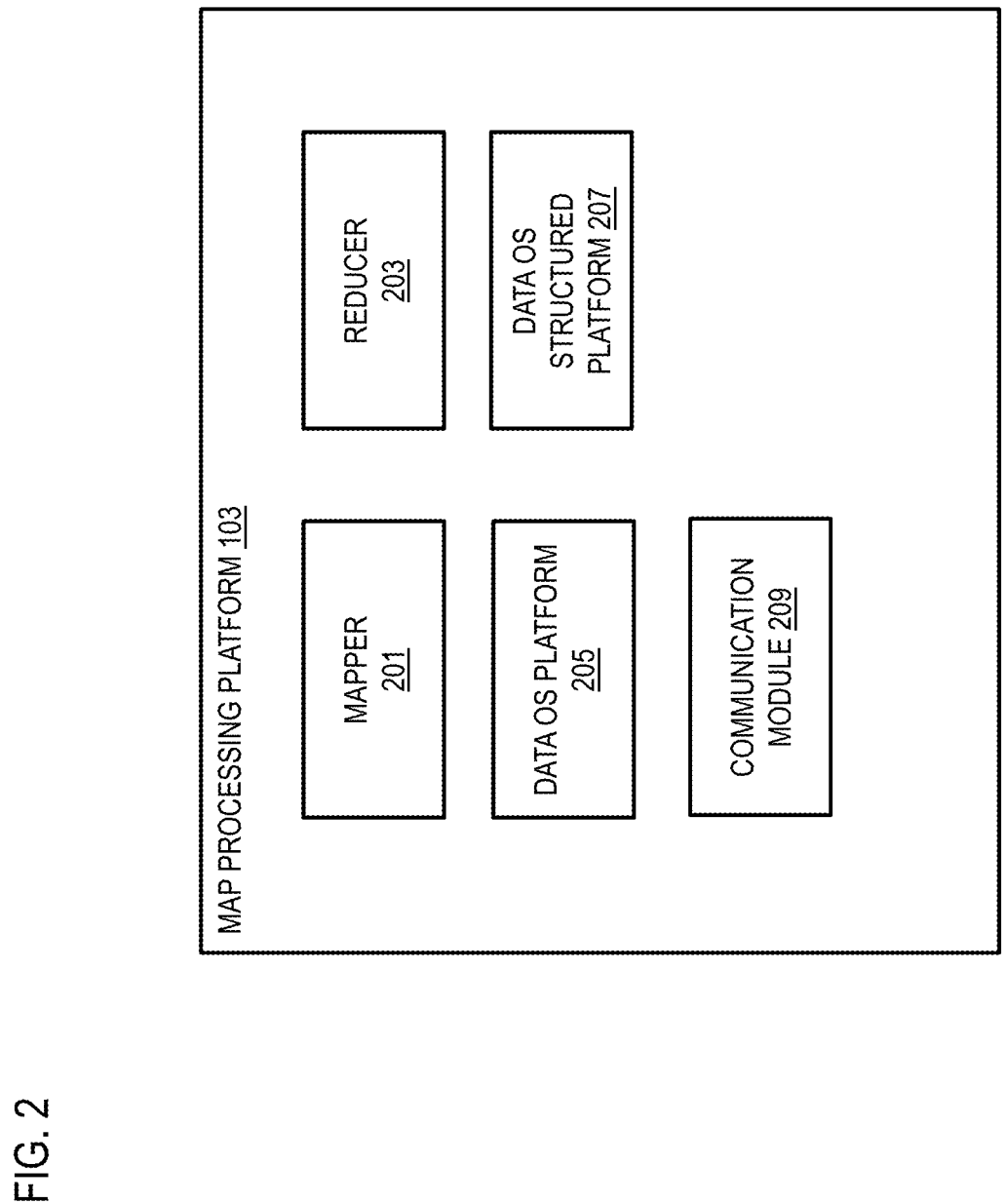
FIG. 2 is a diagram of the components of a map processing platform, according to one embodiment.

FIG. 2 is a diagram of the components of map processing platform 103, according to one embodiment. By way of example, the map processing platform 103 includes one or more components for providing a unified extensible platform for overall probe data and storage. It is contemplated that the functions of these components may be combined in one or more components or performed by other components of equivalent functionality. In this embodiment, the map processing platform 103 includes a mapper module 201, a reducer module 203, an analytics platform 205, a structured data store platform 207 and a communication module 209.

In one embodiment, the map processing platform 103 receives probe data from different providers by way of the communication module 209 and brings the probe data into a consistent internal representation (i.e. ingestion). The map processing platform 103 processes the probe data based on the internal probe data representation. An overall scheme for probe data ingestion may be, for example, probe data coming into system in a form of files (e.g. .csv, but other data formats are anticipated) that are used as an input to a Map/Reduce job, which parallelizes ingestion of large amounts of input data. The mapper 201 may then process every ingested probe point (hundreds or even thousands of mappers 201 can run in parallel) individually. For every probe point the mapper 201 calculates the tile that it belongs and its timestamp. The tile designation and timestamp may be used as a compound key for a reducer 203. Once the mappers 201 are finished, a processing module like "Hadoop" shuffles and sorts the results of all the maps to reducers 203. This guarantees that all the probe points with a given key are directed to the same reducer 203. The amount of reducers 203 is scalable and can be configured based on the amount of the input data. The reducer 203 then writes the newly ingested data into an internal system for representation. Additionally during the probe ingestion, filtering (based on verification of required fields) and calculation of secondary properties can also be provided.

A sample processing application may be provided to the map processing platform 103 in which query probes are supplied for an administrative area. In this embodiment, in addition to the analytics platform 205, a structured data store platform 207 may be leveraged as well. The structured data store platform 207 is used as a lookup table which allows for retrieval of the administrative area's polygon (i.e. reference data). The implementation of this application is a map/reduce job. This job's driver retrieves an administrative area polygon and calculates a set of tiles enclosing the polygon. Once these calculations are complete, a driver splits the probe data extraction between multiple map jobs. The content of the extracted files is processed and a required time interval for representing a set of tiles in parallel is calculated. Each map job implements a secondary filtering, i.e., selecting only probe data for a given administrative area polygon and writes the probe data into the map's output. The map/reduce job in this embodiment has a single reducer 203. Because this job has a single reducer 203, all results of all map's jobs are passed to the single reducer 203, and the reducer 203 writes out all the results of the query.

Figure 3A:
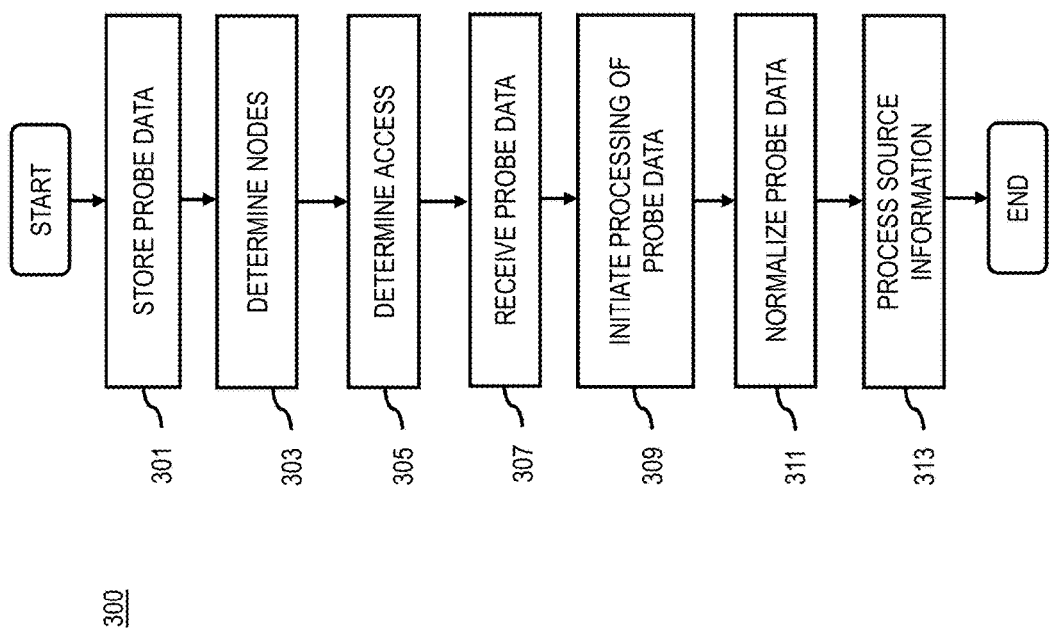
FIGS. 3A-3B are flowcharts of a process for providing a unified extensible platform for overall probe data and storage, according to one embodiment.
Figure 3B:
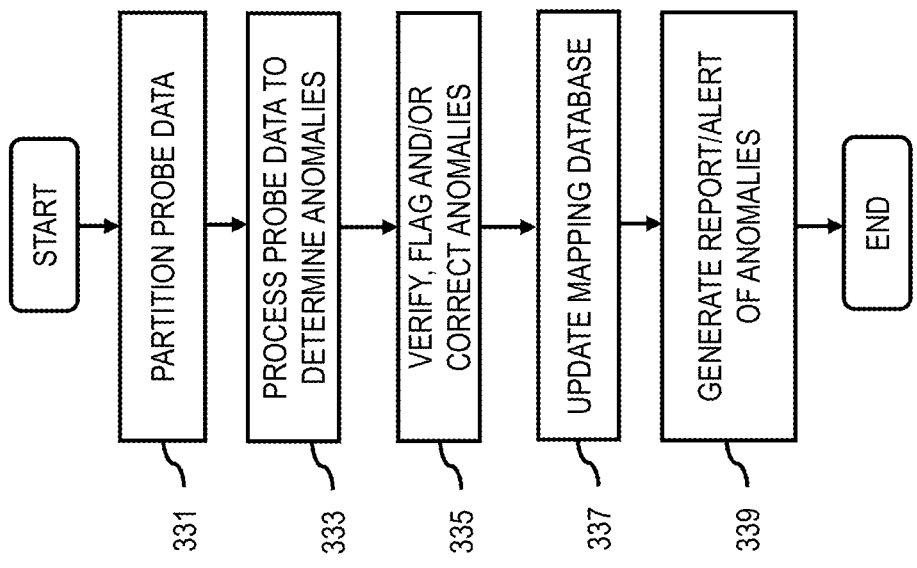
Figure 11:
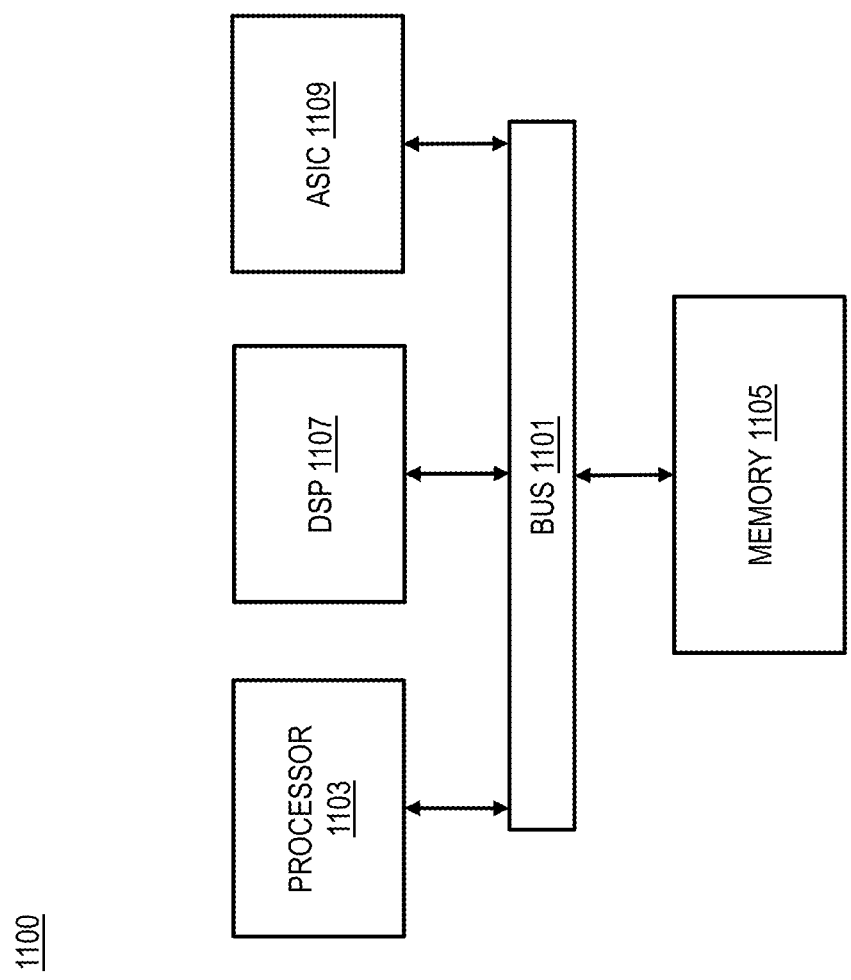
FIG. 11 is a diagram of a chip set that can be used to implement an embodiment of the invention.

FIGS. 3A and 3B are flowcharts of processes for providing a unified extensible platform for overall probe data and storage, according to one embodiment. In one embodiment, the map processing platform 103 performs the process 300 and is implemented in, for instance, a chip set including a processor and a memory as shown in FIG. 11. In step 301, probe data is stored in one or more information spaces, one or more namespaces of the one or more information spaces, or a combination thereof. The process continues to step 303 in which a determination is made of one or more nodes for processing the probe data based, at least in part, on one or more context criteria, the one or more nodes associated with the one or more information spaces. Next, in step 305, a determination is made to provide access to the processed probe data via the one or more information spaces, the one or more namespaces, or a combination thereof. The process continues to step 307 in which the probe data is received continuously, periodically, according to a schedule, on demand, or a combination thereof from one or more vendors, one or more devices, or a combination thereof. Next, in step 309, the map processing platform 103 initiates the processing of the probe data based, at least in part, on the receiving of the probe data. The process continues to step 311 in which the probe data is normalized based, at least in part, on one or more schemas associated with the one or more information spaces, the one or more namespaces, or a combination thereof. Next, the process continues to step 313 in which source information associated with the probe data is processed to determine one or more weighting values for at least a portion of the probe data.

FIG. 3B is a flowchart of processes for providing a unified extensible platform for overall probe data and storage, according to one embodiment. In one embodiment, the map processing platform 103 performs the process 330 and is implemented in, for instance, a chip set including a processor and a memory as shown in FIG. 11. In step 331, the probe data is partitioned into one or more tiles based, at least in part, on the one or more context criteria, the one or more tiles representing at least in part a geospatial extent. The storage, the processing, or a combination thereof of the probe data is based, at least in this embodiment, on the one or more tiles. The process continues to step 333 in which the map processing platform 103 processes the probe data to determine one or more anomalies in mapping data associated with the one or more mapping services. Next, in step 335, the map processing platform 103 initiates one or more actions to verify, to flag, to correct, or a combination thereof the one or more anomalies. Then, in step 337, the map processing platform updates the mapping data based, at least in part, on the one or more anomalies, the one or more actions, or a combination thereof. The process continues to step 339 in which the map processing platform 103 generates a report, an alert, or a combination thereof of the one or more anomalies.

Figure 4:
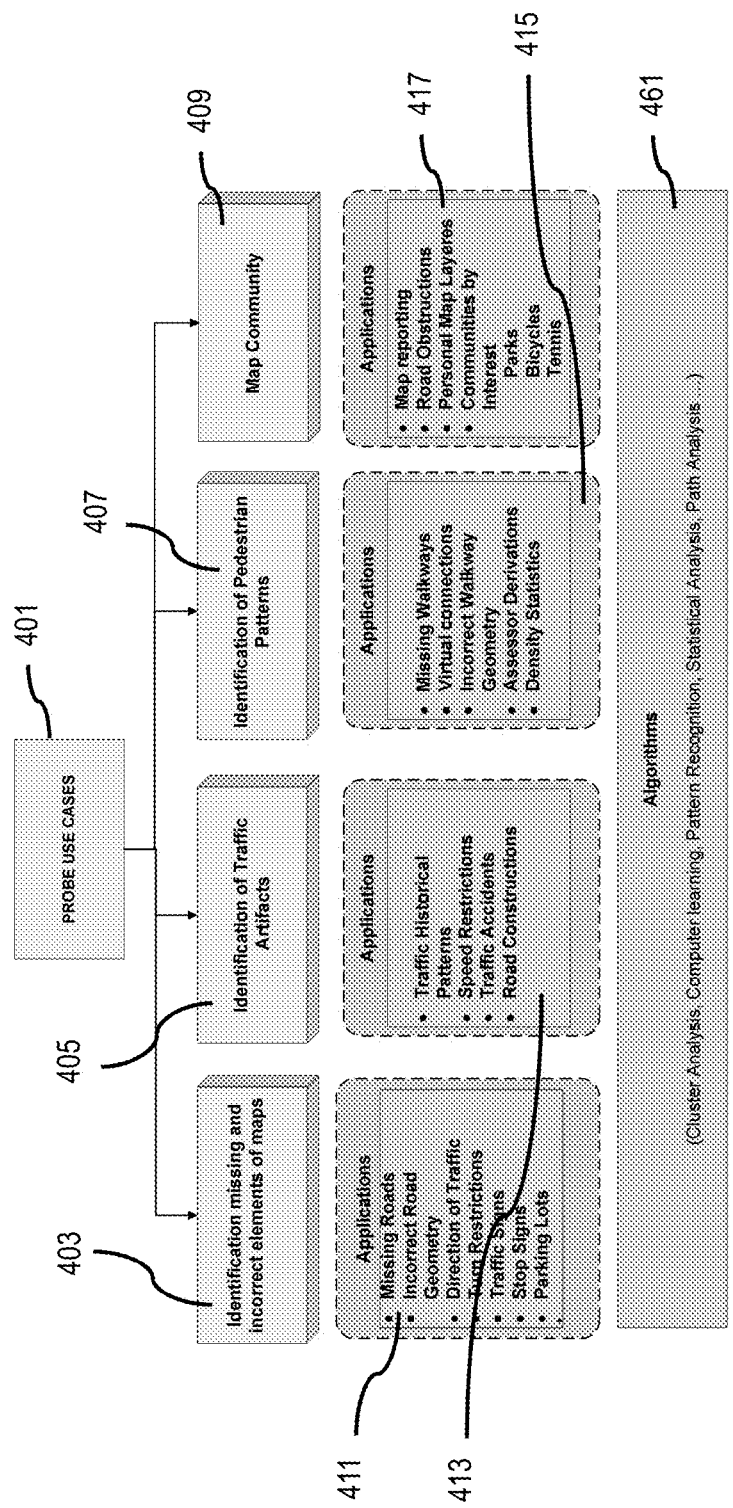
FIG. 4 is a diagram illustrating example probe use cases, according to one embodiment.

FIG. 4 is a diagram illustrating example probe use cases 401. The probe data may relate to navigation data 403, traffic information 405, pedestrian information 407, map community information 409, etc.

Specifically, the navigation data 403 may be, for example, applications 411 that relate to missing road information, incorrect road information, direction of traffic information, turn restriction information, traffic sign information, stop sign information, parking lot information, or any combination thereof. The traffic information may be applications 413 that relate to traffic pattern history information, traffic speed information, traffic speed restriction information, road construction information, or any combination thereof, for example. The pedestrian information may be, for example, applications 415 that relate to incorrect walkway or crosswalk information, access information, density information, or any combination thereof. And, the map community information may be, for example, applications 417 that relate to map reporting information, road obstruction information, personal map layer information, places of interest information, or any combination thereof. Algorithms 421 that relate to cluster analysis, computer learning, pattern recognition, statistical analysis, path analysis, etc. may be applied to the probe data for processing. For example, a pattern of pedestrian traffic may be detected in a certain area at a certain time. This pattern may be used for determining projected traffic patterns for that location at a particular time, and any anomalies that are not in accordance with the historical pattern may be flagged, alerted and/or reported. The project traffic patterns may also be used in calculating estimated times of travel between two locations, for example, or may serve as a basis for determining an optimal route of travel that may be provided by a navigation service provider. Other analyses may apply to any mode of travel at any time and any location whether it be terrestrial, extraterrestrial or virtual.

Figure 5:
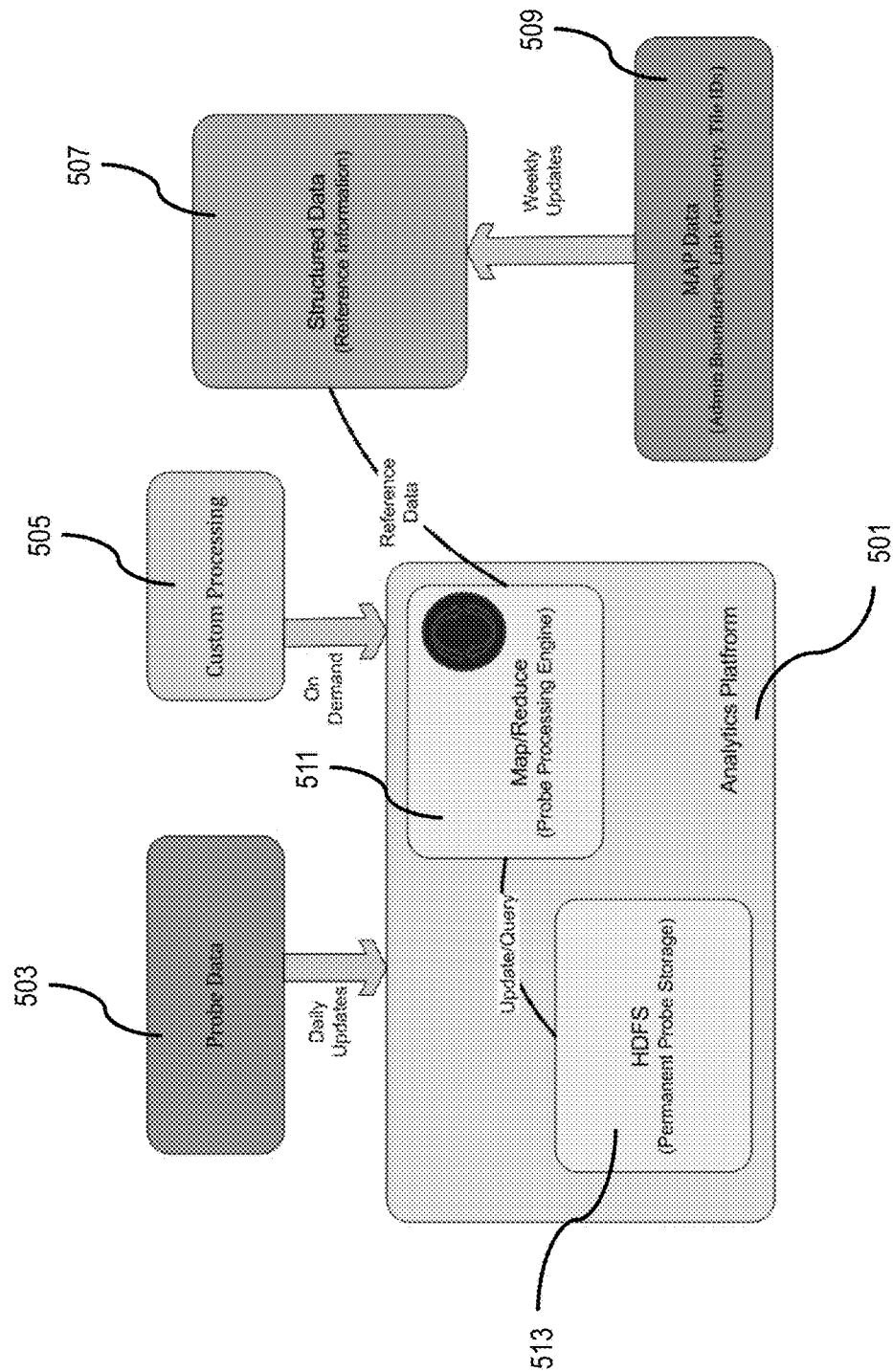
FIG. 5 is a diagram illustrating the creation of a unified analytics platform, according to one embodiment.

FIG. 5 is a diagram illustrating the creation of a unified analytics platform 501 that contains all the probe data 503 available and provides a unified framework for probe data accessing and processing allows for easily creating new solutions, which can leverage existing solutions and their intermediate results. Single probe data 503 contains at least three types of properties: required properties (such as latitude, longitude, time, vendor, speed and some others), optional properties (such as number of satellites, accuracy and some others), and secondary (calculated) properties (such as road segment, probe position on a road segment, type of road and some others), for example. The analytics platform 501 receives probe data 503, as well as data from custom processing 505, and MAP data 509 in a structured data format 507. The custom processing 505 may be any type of manual input or manipulation of data that is input into the analytics platform 501 for processing. The analytics platform 501, in this embodiment, includes a Map/Reduce engine 511 that processes all of the data that is received by the analytics platform 501 and maps all of the data to particular tile, for example, and sends all of the data to a requisite reducer to process and store all of the received data in a Hadoop Distributed File System (HDFS) 513, or any type of storage system.

Figure 6:
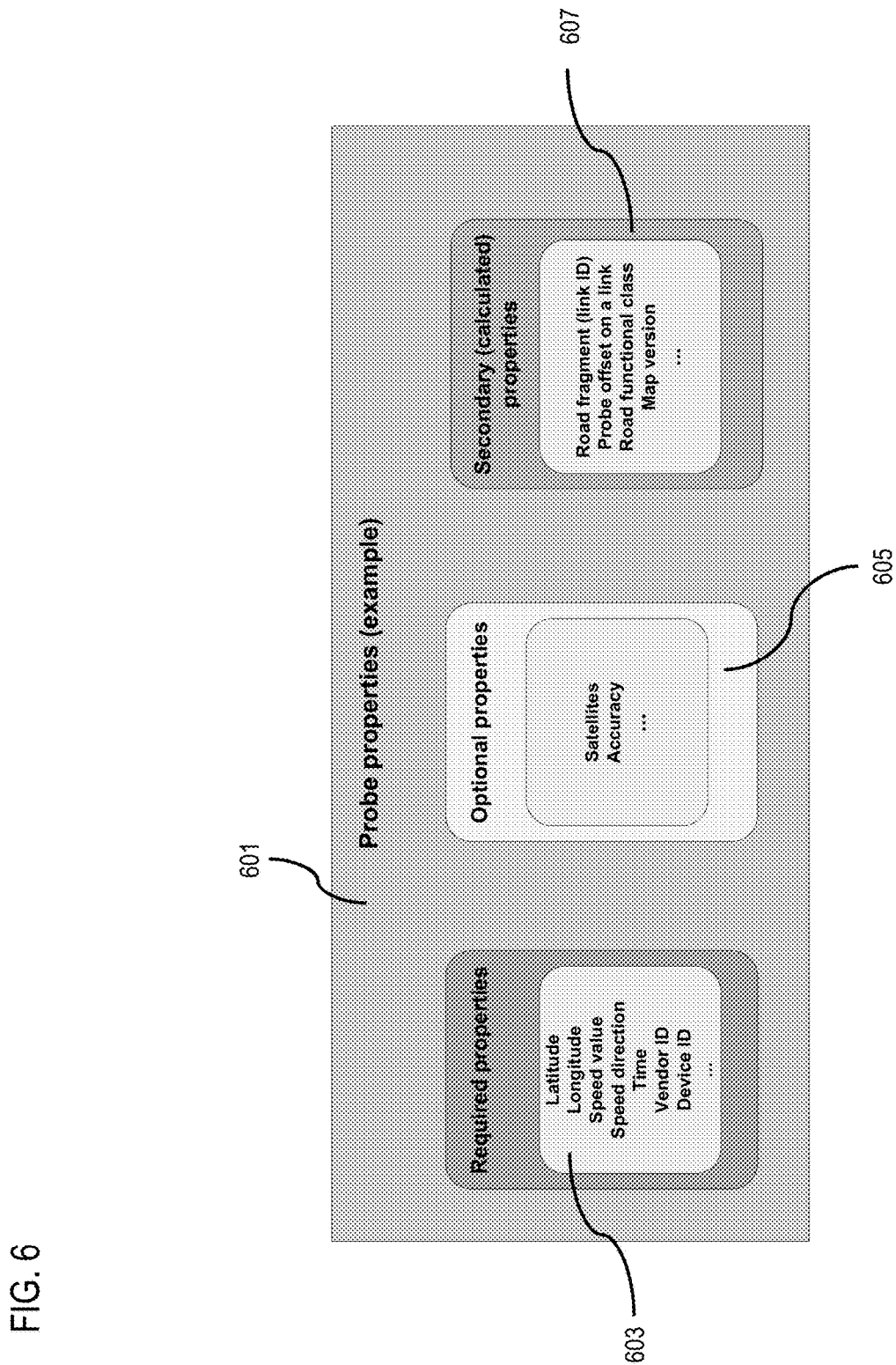
FIG. 6 is a diagram illustrating example probe properties, according to one embodiment.

FIG. 6 is a diagram illustrating example probe properties 601. The probe data may have required properties 603, optional properties 605 and secondary properties 607. The required properties 603 are data properties that may be set at any time, and may include, for example, latitude and longitude, speed, direction, time, a vendor ID, a device ID, etc. Optional properties 605 may include, for example, satellites that are used for obtaining probe information, an accuracy level or allowance of the information, etc. Secondary properties 607 may include, for example, road fragment data, probe offset data, road function class (e.g. one way, construction, public road, private road, etc.), a map version, date of the map version, etc.

Figure 7:
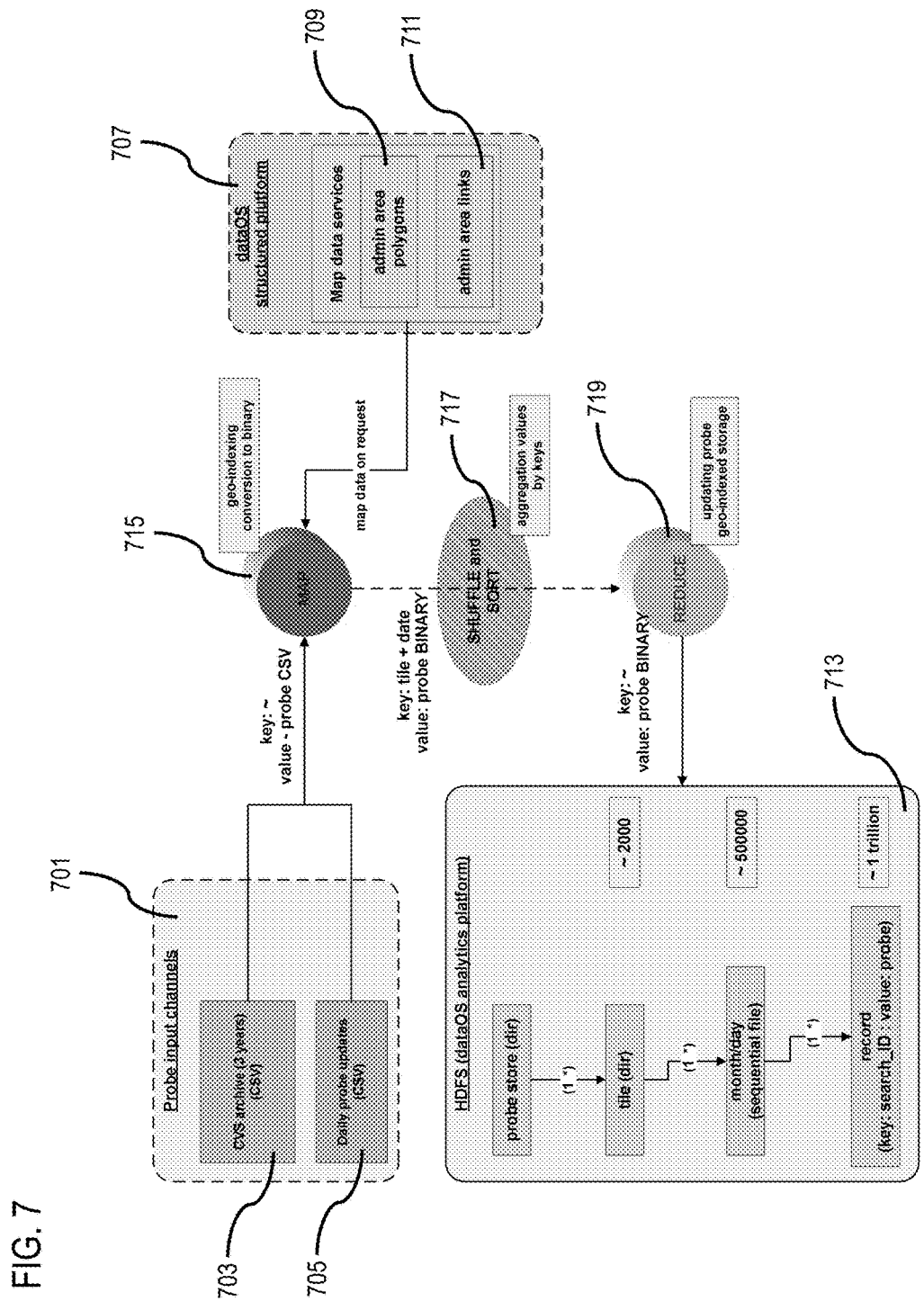
FIG. 7 is an illustration of a flow of probe data, according to one embodiment.

FIG. 7 is an illustration of a flow of probe data 701 having archived data 703 and daily probe updates 705 and data from a structured data store platform 707 having admin area polygons 709 and admin area lines 711 from their respective sources to analytics platform 713. The probe data 701 and the structured data 707 are sent to a mapper 715. The mapper 715 determines what tile and timestamp should be given to probe data based on the structured data 707 and the admin data 709 and 711. The tile and timestamped probe data is shuffled and sorted at 717 to send the probe data to a reducer 719 that the probe data 701 is assigned to. The reducer 719 tags and groups appropriate probe data together and send the probe data that has been reduced to the analytics platform 713 for storage. In the analytics platform 713, the probe data is stored in an assigned directory, which is then broken down into a tile directory, a time stamp directory and a record is made of the probe data.

Figure 8:
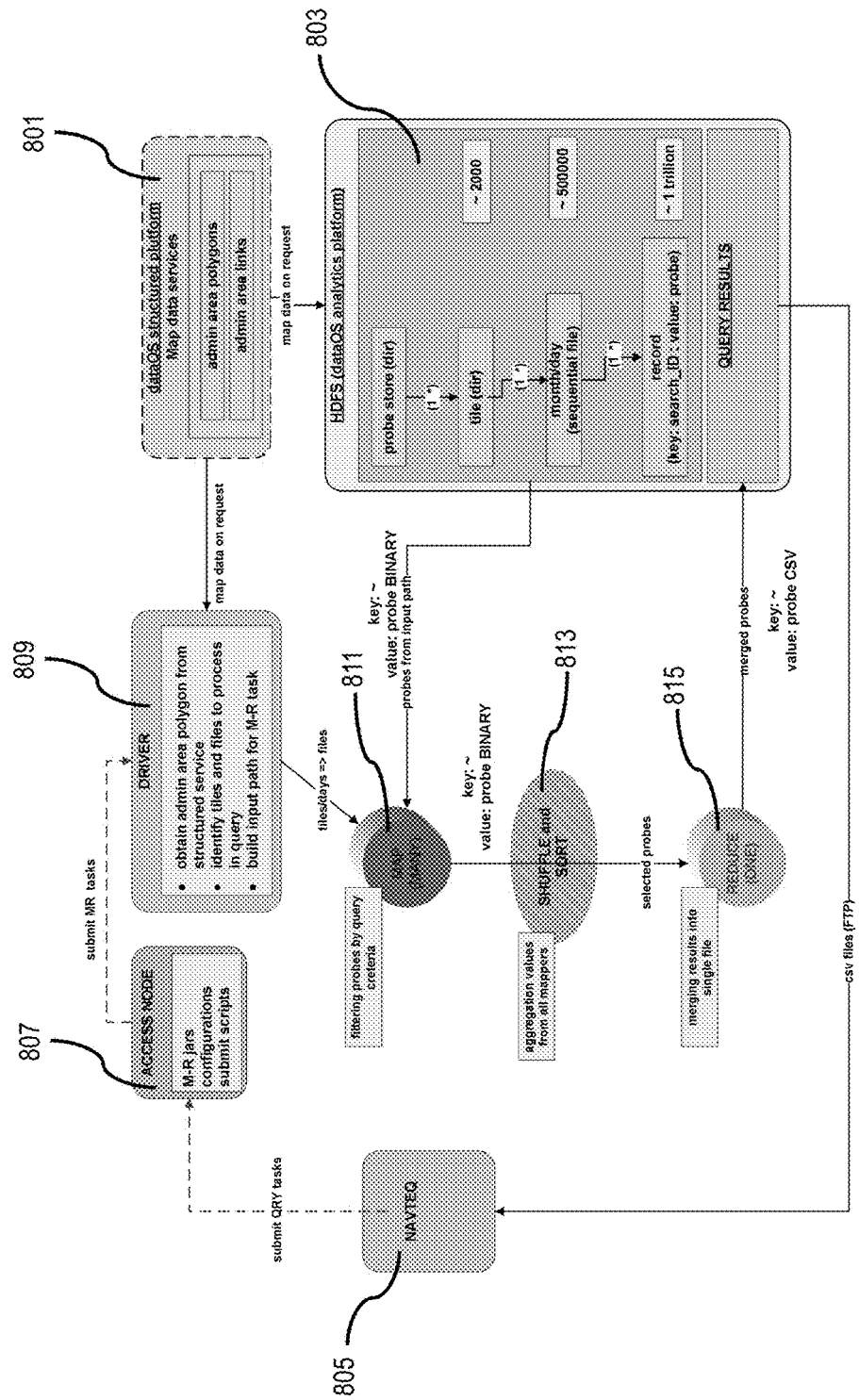
FIG. 8 is a diagram of a flow for producing query results from an analytics platform, according to one embodiment.

FIG. 8 is a diagram of a flow for producing query results from analytics platform 803. A structured data store platform 801 has admin area polygons and admin area links stored within it. The structured data store platform 801 shares this admin data with the analytics platform 803 for processing and storage and with a driver 809. Probe data that is stored in the analytics platform 803 is sent to a mapper 811 for mapping, then to be shuffled and sorted at 813 and then to a reducer 815 for reduction to a format that is receivable by the analytics platform 803. The analytics platform 803 responds to a query for probe data from a navigation service provider 805 and sends that information to the navigation service provider 805 as a .csv file, for example. The navigation service provider 805 then sends the query results to an access node 807 that is determined and selected and the process is repeated as the probe data is continually updated.

Figure 9:
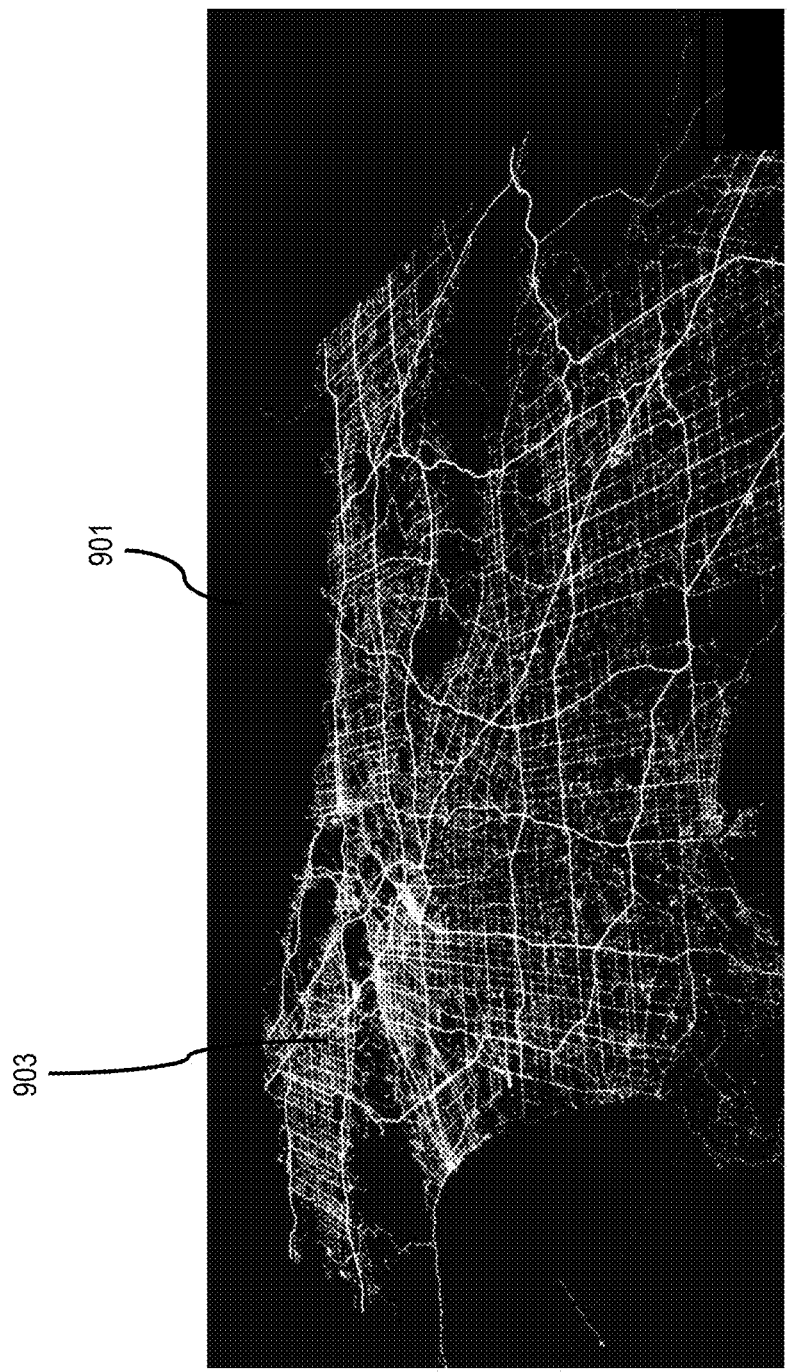
FIG. 9 is an illustration of a map that illustrates an example administrative area; according to one embodiment.

FIG. 9 is an illustration of a map 901 that illustrates and example administrative area 903. The map 901 illustrates how closely probes are associated with a network or roadways on a map, and how a visual presentation can be used to correct road geometry on maps. All of the highlighted areas on the map may be best explained by locations of probe data sources. So, for more densely populated areas, there is more probe data available than less densely populated areas. A bounding box or administrative polygon may be illustrated as the boundaries of the map or area in which a query for probe data may be based. For example, in a map of Los Angeles, the bounding box may be limited to the actual boundaries of the city of Los Angeles so that extraneous probe data that would appear outside of the city limits does not appear on the map.

The processes described herein for providing a unified extensible platform for overall probe data and storage may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
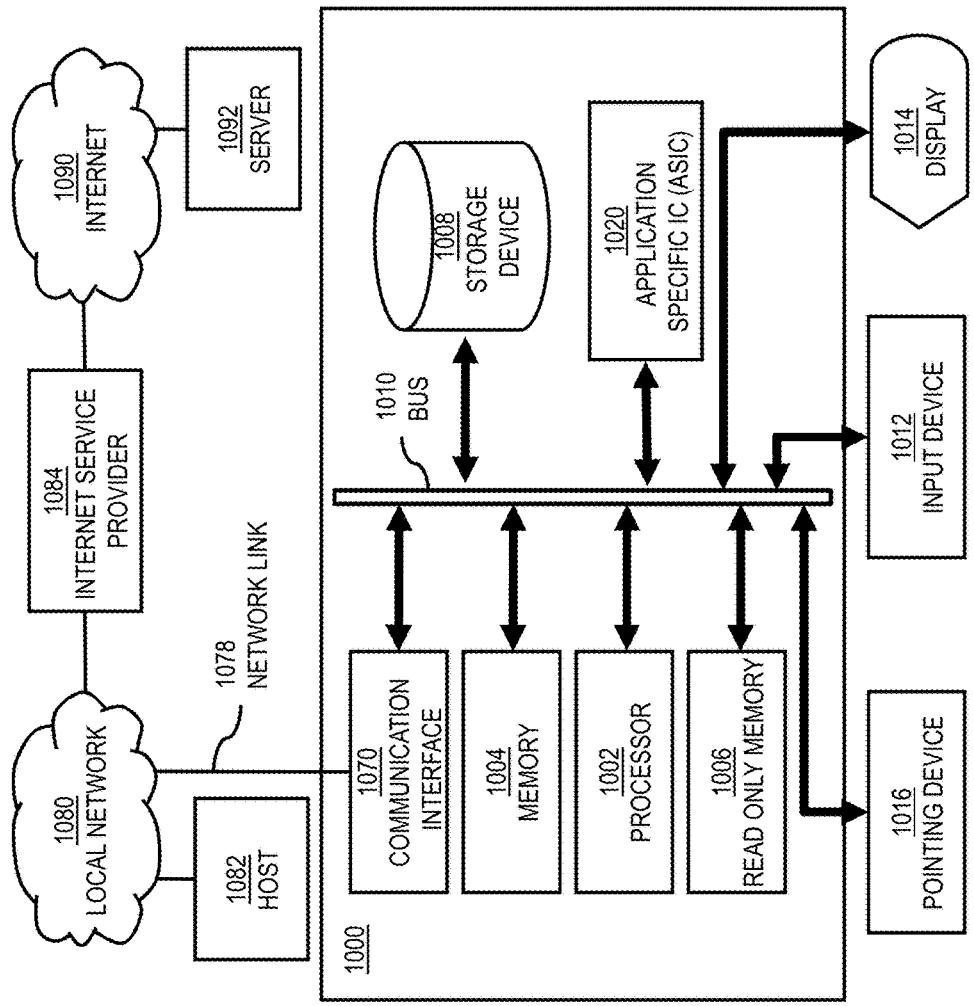
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to providing a unified extensible platform for overall probe data and storage as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of providing a unified extensible platform for overall probe data and storage.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to providing a unified extensible platform for overall probe data and storage. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for providing a unified extensible platform for overall probe data and storage. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing a unified extensible platform for overall probe data and storage, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for providing a unified extensible platform for overall probe data and storage to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide a unified extensible platform for overall probe data and storage as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of providing a unified extensible platform for overall probe data and storage.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide a unified extensible platform for overall probe data and storage. The memory 1105 also stores the data associated with or generated by the execution of the inventive steps.

Figure 12:
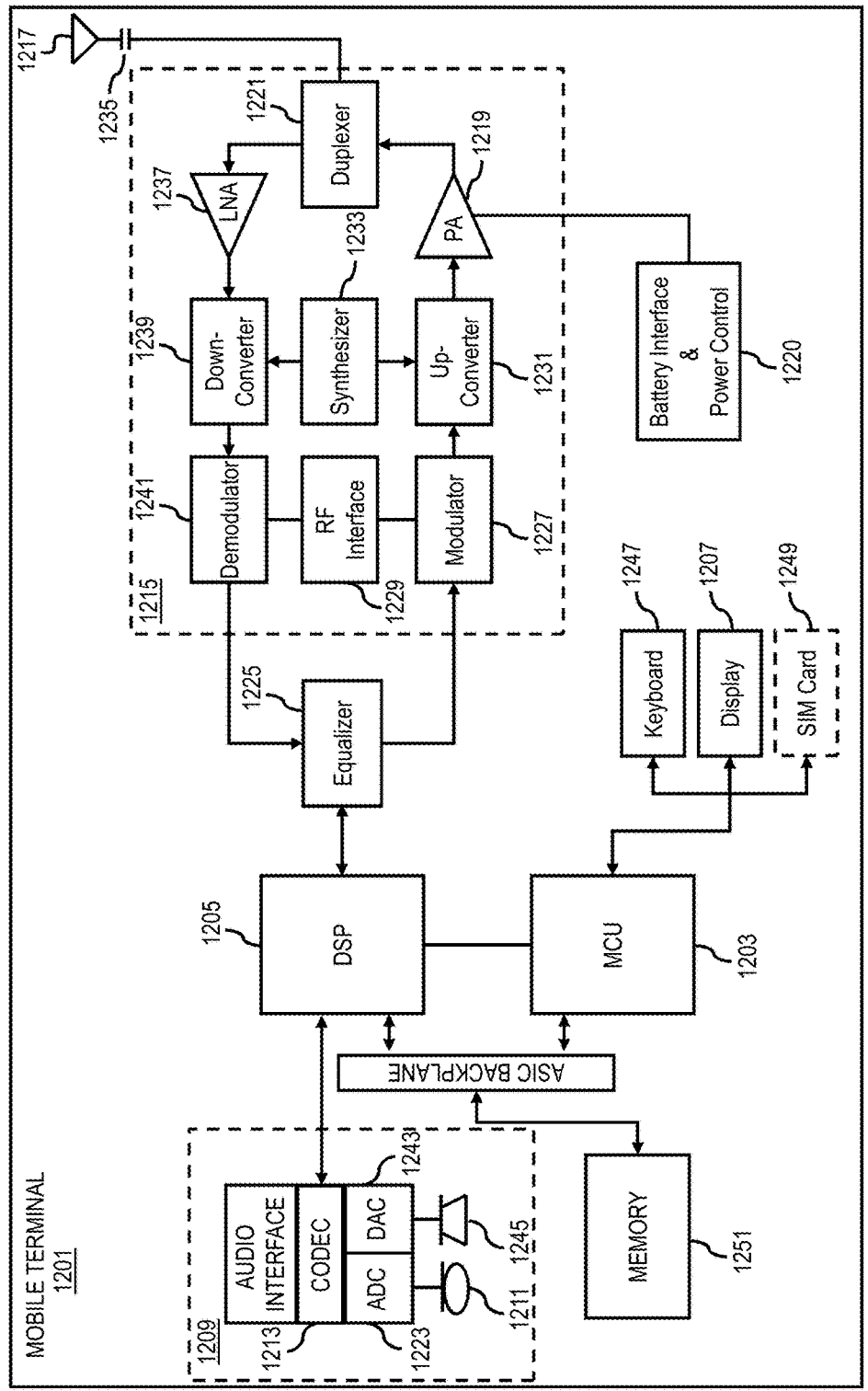
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of providing a unified extensible platform for overall probe data and storage. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of providing a unified extensible platform for overall probe data and storage. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide a unified extensible platform for overall probe data and storage. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving, by an apparatus, probe data points related to a plurality of mapping services;
processing, by a plurality of mappers in the apparatus in parallel, the probe data points as belonging to tiles with respect to a timestamp based, at least in part, on one or more context criteria, wherein each of the tiles represents a geospatial extent that is a bounding box encloses mapping data;
for every one of the probe data points, assigning a respective tile and the timestamp to the probe data point as a respective compound key, wherein the respective compound key is shared by probe data points belonging to the respective tile at the timestamp;
in response to a mapping query from a user device via a network to the mapping services, retrieving, by the apparatus, an administrative area polygon;
determining, by the apparatus, a set of the tiles enclosing the polygon;
filtering, by the apparatus, for a subset of the probe data points corresponding to the set of the tiles based, at least in part, on the mapping query;
shuffling and sorting the subset of the probe data points to a plurality of reducers in the apparatus per the respective compound key;
for every one of the set of the tiles, writing by a respective one of the reducers probe data points sharing the respective compound key into the respective tile; and
initiating, by the apparatus, a presentation consisting of the set of the tiles for the mapping query on a user interface of the user device.

2. A method of claim 1, further comprising:
receiving the probe data points continuously, periodically, according to a schedule, on demand, or a combination thereof from one or more vendors, one or more devices, or a combination thereof;
converting the probe data points into a consistent internal representation; and
processing the probe data points in the consistent internal representation into the tiles.

3. A method of claim 1, further comprising:
dividing the processing of the probe data points corresponding to the set of the tiles per tile; and
executing the divided processing in parallel.

4. A method of claim 1, further comprising:
normalizing the probe data points based, at least in part, on one or more schemas associated with the one or more information spaces, the one or more namespaces, or a combination thereof.

5. A method of claim 1, further comprising:
processing source information associated with the probe data points to determine one or more weighting values for at least a portion of the probe data points,
wherein the probe data points is processed based, at least in part, on the weighting value.

6. A method of claim 1, comprising:
initiating a storage of the probe data points in one or more information spaces, a storage of the probe data points in one or more namespaces of the one or more information spaces, or a combination thereof, based, at least in part, on the tiles;
determining one or more nodes for processing the probe data points based, at least in part, on the tiles, the one or more nodes associated with the one or more information spaces; and
providing access to the processed probe data points via the one or more information spaces, the one or more namespaces, or a combination thereof, based, at least in part, on the tiles,
wherein the storage, the processing, or a combination thereof of the probe data points is based, at least in part, on the tiles.

7. A method of claim 1, further comprising:
processing the probe data points to determine one or more anomalies in mapping data associated with the one or more mapping services; and
initiating one or more actions to verify, to flag, to correct, or a combination thereof the one or more anomalies,
wherein the mapping query includes traffic obstruction, one or more maps enhancements, pedestrian mapping, personal map layer information, or a combination thereof.

8. A method of claim 7, further comprising:
updating the mapping data based, at least in part, on the one or more anomalies, the one or more actions, or a combination thereof.

9. A method of claim 7, further comprising:
generating a report, an alert, or a combination thereof of the one or more anomalies.

10. A method of claim 7, wherein the mapping data includes, at least in part, navigation data, traffic data, pedestrian data, map community data, or a combination thereof.

11. An apparatus comprising:
at least one processor; and
at least one memory including computer program code for one or more programs,
the at least one memory and the computer program code configured to, with the at least one processor, cause the apparatus to perform at least the following,
receive probe data points related to a plurality of mapping services;
process, by a plurality of mappers in the apparatus in parallel, the probe data points as belonging to tiles with respect to a timestamp based, at least in part, on one or more context criteria, wherein each of the tiles represents a geospatial extent that is a bounding box encloses mapping data;
for every one of the probe data points, assign a respective tile and the timestamp to the probe data point as a respective compound key, wherein the respective compound key is shared by probe data points belonging to the respective tile at the timestamp;
in response to a mapping query from a user device via a network to the mapping services, retrieve an administrative area polygon;
determine a set of the tiles enclosing the polygon;
filter for a subset of the probe data points corresponding to the set of the tiles based, at least in part, on the mapping query;
shuffle and sort the subset of the probe data points to a plurality of reducers in the apparatus per the respective compound key;
for every one of the set of the tiles, write by a respective one of the reducers probe data points sharing the respective compound key into the respective tile; and
initiate a presentation consisting of the set of the tiles for the mapping query on a user interface of the user device.

12. An apparatus of claim 11, wherein the apparatus is further caused to perform at least the following:
receive the probe data points continuously, periodically, according to a schedule, on demand, or a combination thereof from one or more vendors, one or more devices, or a combination thereof.

13. An apparatus of claim 12, wherein the apparatus is further caused to perform at least the following:
execute the processing of the probe data points in parallel.

14. An apparatus of claim 11, wherein the apparatus is further caused to perform at least the following:
normalize the probe data points based, at least in part, on one or more schemas associated with the one or more information spaces, the one or more namespaces, or a combination thereof.

15. An apparatus of claim 11, wherein the apparatus is further caused to perform at least the following:
process source information associated with the probe data points to determine one or more weighting values for at least a portion of the probe data points,
wherein the processing of the probe data points is based, at least in part, on the weighting value.

16. An apparatus of claim 11, wherein the probe data points relate, at least in part, to one or more mapping services, and the apparatus is further caused to perform at least the following:

initiate a storage of the probe data points in one or more information spaces, a storage of the probe data points in one or more namespaces of the one or more information spaces, or a combination thereof, based, at least in part, on the tiles;
determine one or more nodes for processing the probe data points based, at least in part, on the tiles, the one or more nodes associated with the one or more information spaces; and
provide access to the processed probe data points via the one or more information spaces, the one or more namespaces, or a combination thereof, based, at least in part, on the tiles,
wherein the storage, the processing, or a combination thereof of the probe data points is based, at least in part, on the tiles.

17. An apparatus of claim 11, wherein the apparatus is further caused to perform at least the following:
process the probe data points to determine one or more anomalies in mapping data associated with the one or more mapping services; and
initiate one or more actions to verify, to flag, to correct, or a combination thereof the one or more anomalies.

18. An apparatus of claim 17, wherein the apparatus is further caused to perform at least the following:
initiate one or more updates to the mapping data based, at least in part, on the one or more anomalies, the one or more actions, or a combination thereof.

19. A non-transitory computer-readable storage medium carrying one or more sequences of one or more instructions which, when executed by one or more processors, cause an apparatus to at least perform the following steps:
receiving probe data points related to a plurality of mapping services;
processing, by a plurality of mappers in the apparatus in parallel, the probe data points as belonging to tiles with respect to a timestamp based, at least in part, on one or more context criteria, wherein each of the tiles represents a geospatial extent that is a bounding box encloses mapping data;
for every one of the probe data points, assigning a respective tile and the timestamp to the probe data point as a respective compound key, wherein the respective compound key is shared by probe data points belonging to the respective tile at the timestamp;
in response to a mapping query from a user device via a network to the mapping services, retrieving an administrative area polygon;
determining a set of the tiles enclosing the polygon;
filtering for a subset of the probe data points corresponding to the set of the tiles based, at least in part, on the mapping query;
shuffling and sorting the subset of the probe data points to a plurality of reducers in the apparatus per the respective compound key;
for every one of the set of the tiles, writing by a respective one of the reducers probe data points sharing the respective compound key into the respective tile; and
initiating a presentation consisting of the set of the tiles for the mapping query on a user interface of the user device.

* * * * *